(12) United States Patent
Yang et al.

(10) Patent No.: US 12,331,988 B2
(45) Date of Patent: Jun. 17, 2025

(54) CONTROL SYSTEM AND CONTROL METHOD OF REFRIGERATION ENVIRONMENT IN CLOSED SPACE BASED ON COMPUTER VISION

(71) Applicants: TIANJIN CHENGJIAN UNIVERSITY, Tianjin (CN); XI'AN UNIVERSITY OF ARCHITECTURE AND TECHNOLOGY, Xi'an (CN)

(72) Inventors: Bin Yang, Tianjin (CN); Xiaojing Li, Tianjin (CN); Huangcheng Yao, Tianjin (CN); Yihang Liu, Tianjin (CN); Lingge Chen, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'An (CN)

( * ) Notice: Subject to any disclaimer, the term of this patent is extended or adjusted under 35 U.S.C. 154(b) by 625 days.

(21) Appl. No.: 17/838,266

(22) Filed: Jun. 13, 2022

(65) Prior Publication Data
US 2023/0168027 A1 Jun. 1, 2023

(30) Foreign Application Priority Data
Nov. 26, 2021 (CN) .......................... 202111424903.9

(51) Int. Cl.
F25D 29/00 (2006.01)
G05B 19/042 (2006.01)
G06N 3/08 (2023.01)

(52) U.S. Cl.
CPC ........... *F25D 29/00* (2013.01); *G05B 19/042* (2013.01); *G06N 3/08* (2013.01); *F25D 2600/00* (2013.01); *G05B 2219/2654* (2013.01)

(58) Field of Classification Search
CPC .. F25D 29/00; F25D 2600/00; F25D 2500/06; F25D 2700/06; G05B 19/042;
(Continued)

(56) References Cited

U.S. PATENT DOCUMENTS 10,330,377 B2 * 6/2019 Klingshirn .............. F25D 27/00
2012/0101876 A1 * 4/2012 Turvey ................... G06Q 40/00
705/14.1

(Continued)

*Primary Examiner* — Zhipeng Wang
(74) *Attorney, Agent, or Firm* — Hemisphere Law, PLLC; Zhigang Ma

(57) ABSTRACT

A control system and a control method of refrigeration in a closed space based on computer vision are provided. An image of a food, temperature and humidity information in the closed space are collected, and a type of the food is identified according to the image. The image is processed through Euler video amplification when food is not packaged to obtain surface color distribution information of the food, a state of the food is determined according to the surface color distribution information and a historical learning result, and a state prompt corresponding to the state of the food is provided to a user. Temperature and humidity in the closed space are regulated according to the state of the food. The state of the food is determined according to storage time and a known quality guarantee period when the food is packaged, and another state prompt is provided to the user.

9 Claims, 3 Drawing Sheets

(58) Field of Classification Search
CPC .. G05B 2219/2654; G06N 3/08; G06N 3/044;
G06N 3/045; G06N 3/084; G06T 7/0004;
G06T 7/90; G06T 2207/10016; G06T
2207/10024; G06T 2207/20081; G06T
2207/30128; G06Q 10/087
See application file for complete search history.

(56) References Cited

U.S. PATENT DOCUMENTS

| | | | |
|---|---|---|---|
| 2016/0088262 A1* | 3/2016 | Lee | G06F 3/167 |
| | | | 704/275 |
| 2017/0053516 A1* | 2/2017 | Wu | G06Q 30/0633 |
| 2017/0219279 A1* | 8/2017 | Chae | G01K 1/024 |
| 2020/0003486 A1* | 1/2020 | Kim | H04R 7/045 |
| 2020/0219606 A1* | 7/2020 | Koh | G06Q 30/0631 |
| 2021/0131718 A1* | 5/2021 | Jeong | F25D 27/00 |
| 2021/0199371 A1* | 7/2021 | Han | G06V 10/255 |
| 2022/0136766 A1* | 5/2022 | Harris | F25D 29/00 |
| | | | 62/126 |
| 2022/0325944 A1* | 10/2022 | Wu | G06F 16/9038 |

\* cited by examiner

CONTROL SYSTEM AND CONTROL METHOD OF REFRIGERATION ENVIRONMENT IN CLOSED SPACE BASED ON COMPUTER VISION

TECHNICAL FIELD

The disclosure relates to the field of closed space refrigeration environment control technologies, and more particularly to a control system and a control method of refrigeration in a closed space based on computer vision.

BACKGROUND

Refrigeration technology is a way to regulate gas environment in a closed space where stored items are stored, and it is also a common means to prolong storage life of food. At present, the widely used refrigeration technology in the field of food fresh-keeping consumes a lot of energy, but this consumption does not achieve a purpose of maximizing a use of food. Therefore, it is urgent to improve a control system of refrigeration environment and its control method to solve the above problems.

At present, the widely used traditional refrigeration environment control technology cannot regulate environmental parameters of the closed space according to local conditions and physical conditions, nor can give early warning of food expiration. Only after the food has expired can people make a judgment through a surface condition or smell of the food, which leads to a lot of food waste, cannot meet needs of personnel for efficient and convenient food management, and is not conducive to energy conservation. Moreover, users judge a current situation of food according to their own experience and knowledge, without considering what kind of temperature and humidity conditions of the food can achieve a best preservation effect.

To sum up, the traditional refrigeration environment control mode has many limitations as follows.

1. in a traditional closed space refrigeration system, managers are in a relatively passive state, which will be affected by many factors, such as forgetting or misremembering a spoilage date of food. Therefore, corresponding measures cannot be made effectively and quickly, and even if the managers initiatively check a state of the food, they cannot make accurate judgments.

2. in a traditional closed space, an only way to identify a situation in the refrigeration space through personnel observation, which cannot monitor the food spoilage inside the space in real time, and cannot remotely control the environment in the closed space.

3. at present, there are two extreme situations in the control of refrigeration environment in most closed spaces. Specifically, a lot of energy is spent to create a low-temperature working condition to ensure freshness of food, and a temperature of refrigeration is improved to save energy.

4. using a camera alone to capture food information inside the closed space would cause many adverse conditions, such as reduced accuracy and reduced robustness.

SUMMARY

In view of the above problems or defects existing in the existing refrigeration environment control system, a purpose of the disclosure is to provide a control system and a control method of refrigeration environment in a closed space based on computer vision, which can timely remind managers of a state of a food, so as to avoid the occurrence of food poisoning, regulate the refrigeration environment according to types of food and food fresh-keeping conditions, and avoid a large amount of waste of the food.

The disclosure is realized through the following technical solutions:

in an aspect, a control system of refrigeration environment in a closed space based on computer vision may include a data collector, an information processor, an artificial intelligence processor, and an environment regulator.

The data collector is configured to collect an image of a food in the closed space and transmit collected image the food to the information processor, and collect temperature and humidity information in the closed space and transmit collected temperature and humidity information to the environment regulator.

The information processor is configured to identify a type of the food according to the collected image of the food received from the data collector; and further configured to: in response to the food being not packaged, process, the collected image of the food through Euler video amplification to obtain surface color distribution information of the food, determine a state of the food according to the surface color distribution information of the food and a historical learning result of the artificial intelligence processor, output a first state prompting instruction and an regulation instruction corresponding to the state of the food to the artificial intelligence processor and the environment regulator respectively, and send the surface color distribution information of the food to the artificial intelligence processor; and in response to the food being packaged, determine storage time of the food in the closed space according to a historical record, and output a second state prompting instruction to the artificial intelligence processor according to the storage time and a preset time threshold.

The artificial intelligence processor is configured to provide, in response to one of the first state prompting instruction and the second state prompting instruction received from the information processor, a state prompt to a user, receive and identify user feedback information, perform deep-learning using a deep-learning algorithm according to the surface color distribution information of the food, the one of the first state prompting instruction and the second prompting instruction and the user feedback information to thereby obtain a learning result, and send the learning result to the information processor.

The environment regulator is configured to regulate, in response to the regulation instruction received from the information processor, temperature and humidity in the closed space.

In an embodiment, the data collector is further configured to transmit the collected temperature and humidity information to the information processor. The information processor is specifically configured to determine the state of the food according to the surface color distribution information of the food, temperature and humidity in the collected temperature and humidity information, and the historical learning result of the artificial intelligence processor.

In an embodiment, the data collector is further configured to collect information of a preset chemical substance in the closed space and transmit collected information of the preset chemical substance to the information processor. The information processor is specifically configured to determine the state of the food according to the surface color distribution information of the food, the temperature and the humidity in the collected temperature and humidity information, the collected information of the preset chemical substance, and the historical learning result of the artificial intelligence processor.

In an embodiment, the data collector may include a non-contact chemical sensor, and the chemical sensor is configured to collect the information of the preset chemical substance in the closed space.

In an embodiment, the control system may further include a light sterilizer. The data collector is further configured to collect information of a preset chemical substance in the closed space and transmit collected information of the preset chemical substance to the information processor. The information processor is further configured to transmit a sterilization instruction to the light sterilizer according to the collected information of the preset chemical substance. The light sterilizer is configured to perform a light sterilization according to the sterilization instruction received from the information processor.

In an embodiment, the information processor is further configured to perform recognition of a food partition to obtain a recognition result and transmit a partition prompting instruction to the artificial intelligence processor according to the recognition result. The artificial intelligence processor is further configured to provide, in response to the partition prompting instruction received from the information processor, a partition prompt to the user.

In an embodiment, the information processor is specifically configured to determine the state of the food according to the surface color distribution information of the food and the historical learning result of the artificial intelligence processor, and obtain remaining fresh-keeping time t of the food; compare the remaining fresh-keeping time t with known fresh-keeping time t' of the food with the same type of the food; output, in response to the remaining fresh-keeping time t being less than or equal to the known fresh-keeping time t', the regulation instruction to the environment regulator; output, in response to the remaining fresh-keeping time t being less than or equal to the known fresh-keeping time t' and the remaining fresh-keeping time t being not equal to 0, a use prompting instruction to a semantic recognizer; and output, in response to the remaining fresh-keeping time t being equal to 0, an expiration prompting instruction to the semantic recognizer.

In an embodiment, the information processor is specifically configured to identify, according to the collected image of the food received from the data collector through a convolution neural network.

In another aspect, a control method of refrigeration environment in a closed space based on computer vision, which is implemented by the control system, including:

collecting an image of a food in the closed space, and temperature and humidity information in the closed space;

identifying a type of the food according to the image of the food; and when the food is not packaged, processing the image of the food through Euler video amplification to obtain surface color distribution information of the food; determining a state of the food according to the surface color distribution information of the food and a historical learning result; providing a first state prompt to a user according to the state of the food; receiving and identifying user feedback information, learning based on the surface color distribution information of the food, the state of the food and the user feedback information to thereby obtain a learning result regulating temperature and humidity in the closed space according to the state of the food; and when the food is packaged, determining storage time of the food in the closed space according to a historical record, determining the state of the food according to the storage time and a known quality guarantee period, and then providing a second state prompt to the user.

Compared with the prior art, the disclosure may include at least beneficial effects as follows.

An implementation object of the disclosure is frozen and refrigerated food in the closed space, which aims to control thermal environment in the closed space according to the different types and quantities of the food. The image of the food in the closed space is collected, and the types of the food are identified according to the received image of the food. If it is packaged food, its quality guarantee period can be extracted, the state of the food is determined according to a comparison between its storage time and the quality guarantee period, and corresponding state prompt is provided according to the determination result. If it is non packaged food, surface color distribution information of the food is extracted through the Euler video amplification, the state of the food is determined according to the surface color distribution information of the food and the historical learning result, and the corresponding state prompt is provided according to the determination result. In addition, whether the environment of the closed space is appropriate is determined according to the state of the food, and the environment of the closed space is regulated according to the determination result. In this way, through the control system of the disclosure, on the one hand, the user can be reminded according to the state of the food to avoid food waste or food poisoning; and on the other hand, the environment of the space can be regulated according to an actual fresh-keeping condition, so as to achieve the purpose of personalized regulation, which can ensure the extension of the fresh-keeping time of the food. The disclosure not only applies the Euler video amplification, but also adds a prediction model of the state of the food supported by a deep learning algorithm, while identifying the user's feedback to provide technical cross-validation for the system, making up for the many shortcomings of the system in the early stage, substantially improving the control accuracy of the control system and preventing the phenomenon of misjudgment. Compared with the traditional closed space refrigeration environment control, the disclosure can provide various personalized services in daily production and life, can be linked with major platforms, has high economic benefits, meets people's needs for human-computer intelligent interaction, and makes the machine better serve people. The control system of the disclosure can be combined with various types of closed spaces, such as freezers, household refrigerators, large freezers, etc. It is suitable for all kinds of refrigeration closed spaces with different sizes and functions, and has a strong flexibility.

Further, since the Euler video amplification may misjudge the result, sensors are required to collect indoor environmental information at the same time, and the indoor food spoilage situation is comprehensively judged after cross-validation, so as to improve the accuracy of the results.

Further, most of the existing technologies use contact chemical sensors, and the measurement has a certain delay. The measurement data cannot be fed back to the user in time. Therefore, the disclosure adopts the non-contact chemical sensor.

Further, according to the information of the preset chemical substance, the sterilization function can be turned on, which can effectively sterilize bacteria in the closed space, so as to reduce cross-infection between foods.

Further, the information processor also performs the recognition of the food partition. If the food is placed in a wrong region, it will prompt the user to correct. In this way, it can ensure that the same type of the food is placed in the similar region, which is convenient for identification and improve the identification accuracy of the system of the disclosure.

The control method realized by the disclosure is to automatically control the refrigeration equipment, so as to avoid various safety accidents caused by improper operation or wrong judgment of managers, so as to achieve the purpose of prolonging the food fresh-keeping time. From the overall effect, the control scheme of this method has great convenience, and can complete the environmental control task with the highest efficiency and accuracy, while avoiding energy waste.

Figure 1:
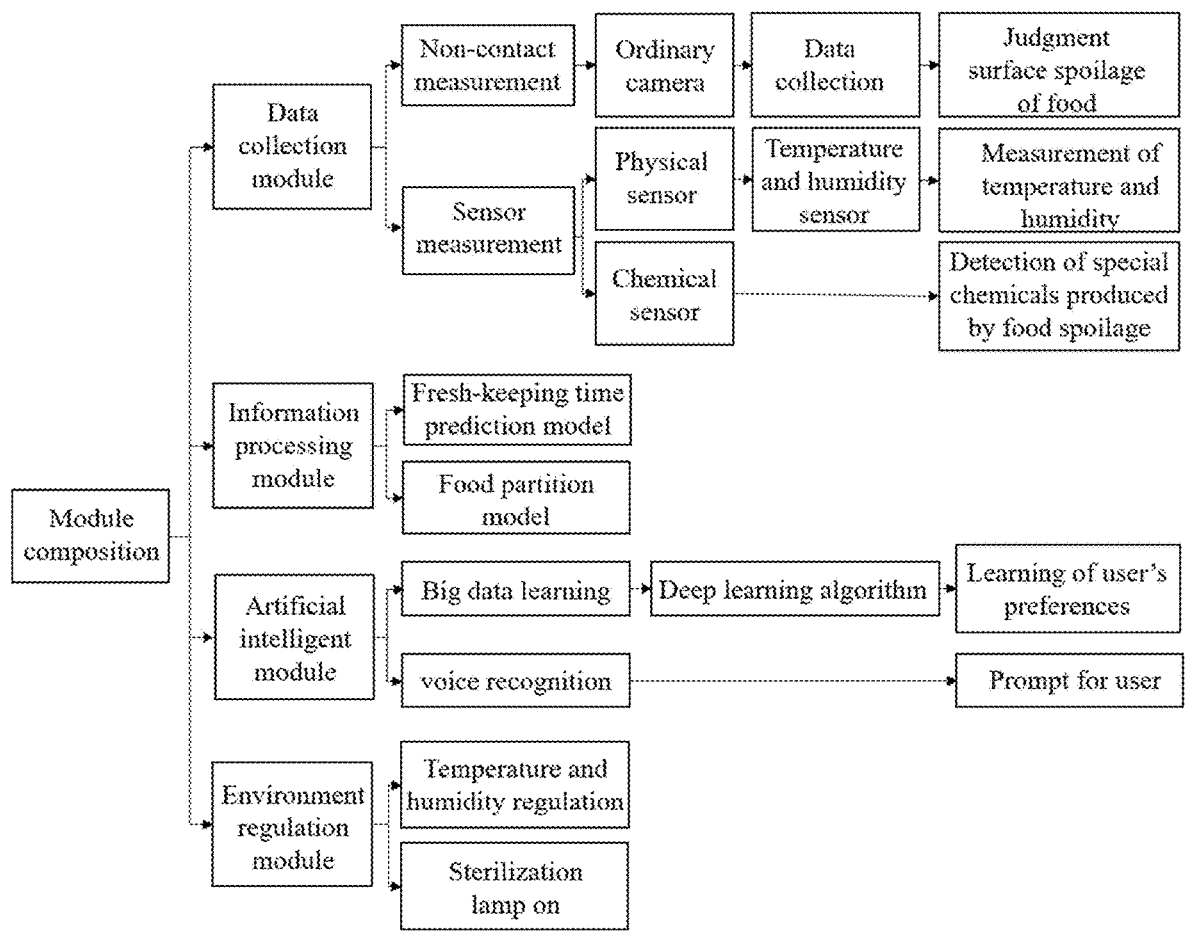
FIG. 1 is a schematic structural diagram of a control system of refrigeration environment in a closed space based on computer vision.

Description of reference numerals: 1—refrigerator, 2—sterilization lamp, 3—camera, 4—food, and 5—sensor.

DETAILED DESCRIPTION OF EMBODIMENTS

In order to further understand the disclosure, the disclosure is described below in combination with embodiments. These descriptions only further explain features and advantages of the disclosure and are not intended to limit the claims of the disclosure.

As shown in FIG. 1, a control system of refrigeration environment in a closed space based on computer vision of the disclosure is provided. The control system may include a data collector (also referred to as data collection module or data acquisition module), an information processor (also referred to as information processing module), an artificial intelligence processor (also referred to as artificial intelligence module), an environment regulator (also referred to as environment regulation module), and a light sterilizer (also referred to as light sterilization module). The artificial intelligence processor may include a big data learner (also referred to as big data learning module) and a semantic recognizer (also referred to as semantic recognition module). It can be understood that the data collector (the data collection module), the information processor (the information processing module), the artificial intelligence processor (the artificial intelligence module), the environment regulator (the environment regulation module), the big data learner (the big data learning module), and the semantic recognizer (the semantic recognition module) each may include a processor and a memory connected to the processor, and the memory includes software modules, executable by the processor.

The data collector may include a camera, a non-contact chemical sensor, and physical sensors.

The camera is configured to collect information of an image of a food in the closed space and output the information of the image of the food to a food partition recognition model, and the camera is installed in a middle of an upper side of a cabinet door in the closed space.

The physical sensors mainly refer to a temperature sensor and a humidity sensor, which are installed on a side wall of the closed space to monitor temperature and humidity in the closed space. The measured data of the physical sensors is transformed into electrical signals and transmitted to a fresh-keeping time (also referred to as preservation time) prediction model, the big data learner and the environment regulator. The non-contact chemical sensor is mainly configured to detect a preset chemical substance, that is, information of a special chemical substance emitted by rotten food, and the detection result is output to the fresh-keeping time prediction model and the big data learner. In order to avoid misjudgment, it is assumed that there will be no wrong placement in each functional region in the closed space.

The information processor mainly includes an image processing module (also referred to as image processor), the fresh-keeping time prediction model, and the food partition recognition model for identifying food types. It can be understood that the image processor (the image processing module) includes a processor and a memory connected to the processor, and the memory includes software modules, executable by the processor.

The food partition recognition model receives the information of the image of the food collected by the camera, identifies and classifies the food according to the information of the image of the food, and outputs a partition prompting instruction to the semantic recognizer if the food is not in its preset partition. If the food is not packaged, the information of the image of the food is transmitted to the image processing module. Otherwise, storage time of the food in the closed space is determined according to a historical record. If time between the storage time and a quality guarantee period of the food is within a preset time range, a use prompting instruction is output to the semantic recognizer. If the storage time reaches or exceeds the quality guarantee period of the food, an expiration prompting instruction is output to the semantic recognizer.

The image processing module uses Euler video amplification technology to process the information of the image of the food, to thereby obtain surface color distribution information of the food and transmit the surface color distribution information of the food to the fresh-keeping time prediction model. Euler video amplification technology can capture some information changes that cannot be recognized by a human visual system, such as blood circulation will change color of human skin. Euler video amplification technology uses Fourier transform to obtain early discoloration scars on the epidermis of fruits or vegetables with signs of decay. The image processing module sends the surface color distribution information of the food to the big data learner.

The Fourier transform is specifically as follows:

based on Gaussian pyramid, spatial filtering can be performed on the image signal, and the image signal is expanded according to Fourier series to obtain the following formula:

$$f(x + \delta(t)) = \sum_{\omega=-\infty}^{\infty} A_\omega e^{i\omega(x+\delta(t))}. \tag{1-1}$$

Then, time-domain filtering is performed and an amplification factor is considered, the value of which can be fine-tuned according to the specific region of interest. After that, the image of the changing signal is synthesized, followed by superposition with the original image, and finally the synthesis method is compiled.

The fresh-keeping time prediction model refers to a historical learning result of the big data learner, determines a current state of the food according to the surface color distribution information of the food, the temperature and humidity of the closed space, and the information of the preset chemical substance, and obtains remaining fresh-keeping time t of the food. The remaining fresh-keeping time t is compared with a known fresh-keeping time t' of the food. If the remaining fresh-keeping time t is greater than the known fresh-keeping time t', it is considered that a food fresh-keeping condition is good, and parameters in the closed space are not regulated. If the remaining fresh-keeping time t is less than or equal to the known fresh-keeping time t', it is considered that the food fresh-keeping condition is poor, and a regulation instruction is output to the environment regulator to prolong the fresh-keeping time. If the food fresh-keeping condition is poor, the remaining fresh-keeping time t is less than or equal to the known fresh-keeping time t' and the remaining fresh-keeping time t is not equal to 0, the use prompting instruction is output to the semantic recognizer. If the food is rotten and the remaining fresh-keeping time t is equal to 0, the expiration prompting instruction is output to the semantic recognizer. If the information of the preset chemical substance is received, a sterilization instruction is output to the light sterilizer.

The semantic recognizer, when receiving the use prompting instruction, prompts the user that the food is about to pass the quality guarantee period and should be used as soon as possible. In this situation, if the user gives feedback, the semantic recognizer identifies information of the feedback and sends information of the received use prompting instruction and the feedback to the big data learner. The semantic recognizer, when receiving the expiration prompting instruction, prompts the user that the food has expired and should be disposed as soon as possible. In this situation, if the user gives feedback, the semantic recognizer identifies information of the feedback and sends information of the received expiration prompting instruction and the feedback to the big data learner. When receiving the partition prompting instruction, the semantic recognizer is configured to prompt the user that the food is put in a wrong position.

The big data learner performs learning according to the received surface color distribution information of the food, the temperature and humidity of the closed space, the information of the preset chemical substance, the information of the use prompting instruction or the expiration prompting instruction, and the information of the user's feedback, to thereby obtain a learning result, and sends the learning result to the fresh-keeping time prediction model. The big data learner specifically refers to learning and memorizing user's preferences through user's behavior habits, and obtaining the user's feedback behavior for correction.

The environment regulator regulates the environment in the closed space according to the regulation instruction and the temperature and humidity of the closed space. When receiving the sterilization instruction, the light sterilizer turns on a sterilization function.

EMBODIMENT

In compliance with the above technical solutions, as shown in FIGS. 1 to 4, the disclosure realizes a control system of refrigeration environment in a closed space.

When the control system takes pictures of food in a cabinet through the camera installed in the closed space and uses sensors to obtain various indoor chemical and physical data, a current state of the food is obtained, and thus fresh-keeping time is determined. However, since Euler video amplification technology may misjudge the results, the sensors are required to collect indoor environmental information at the same time, and comprehensively determine the spoilage of indoor food after cross verification.

Figure 4:
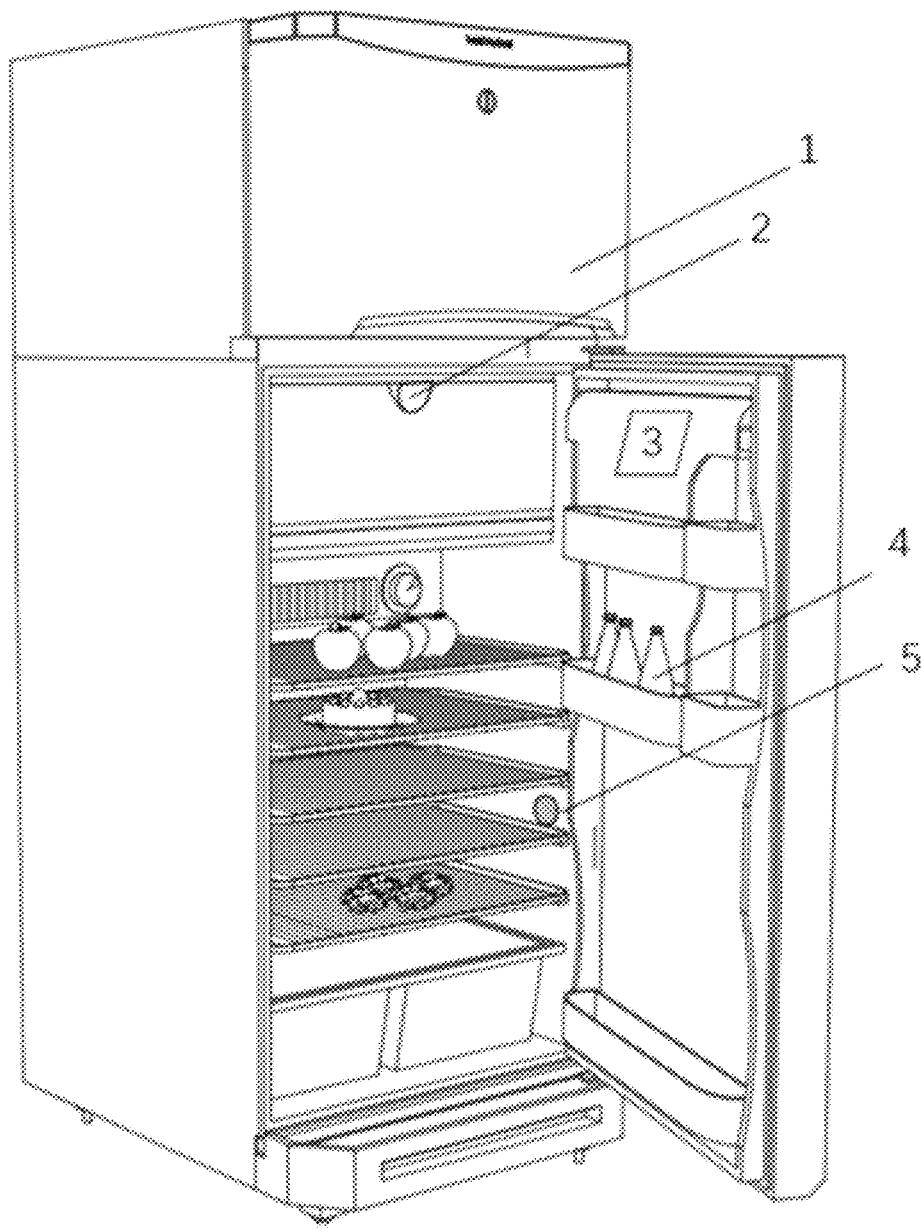
FIG. 4 is a schematic structural diagram of the control system of disclosure for controlling the refrigeration environment in the closed space (taking a household refrigerator as an example).

As shown in FIG. 4, a camera 3 is installed on a cabinet door of a household refrigerator 1, and its monitoring range covers the whole operation range, which can monitor the relevant information of food 4. In this case, the camera is not open all day. When people open the cabinet door, the camera will automatically record and capture a video and transmit the video to the information processor. By comparing the image with an image recorded last time, the details of added food materials can be obtained. However, there will be misjudgment, such as when multiple food materials are placed in overlapping positions, the food materials blocked behind are difficult to be recognized by the camera. A solution is to try to put the same type of food in a similar region. When surfaces of the food materials are not exposed or have an outer package, there is no need to use Euler video amplification technology, and only a food partition recognition model is needed to identify its type and extract a specific quality guarantee period of the food.

Next, the food partition recognition model uses convolutional neural network to recognize the types and number of foods in the image/video, and records them in the information processor for other subsequent operations. When the surfaces of the food materials are not exposed or have the outer package, the specific quality guarantee period of the food can be extracted. Otherwise, Euler video amplification technology is used to determine the state of the food.

Next, Euler video amplification technology amplifies tiny pigment changes of food epidermis, and determines food spoilage based on a function of color changes and time, so as to determine whether the indoor environment needs to be changed. The system calculates the food fresh-keeping time, compares it with the known food fresh-keeping time, and sends corresponding instructions to regulate the environment in the closed space.

Physical and chemical sensors 5 can collect parameter information in the cabinet and compare it with the information collected above, which helps to improve the accuracy of system discrimination. The sensors are installed in various regions of the cabinet, and the chemical sensors installed are slightly different according to the type of articles. Its main purpose is to compare with the data in the above steps to avoid making wrong determination only based on the data obtained in the above steps. At the same time, the measured data of the temperature and the humidity sensor is used as an input of the environment regulator.

Intelligent voice counseling is another behavior correction measure, which can play a variety of roles. Firstly, when food is expired or in short supply, it can send a prompt to remind users to buy or deal with food. Secondly, after the system sends out the food expiration prompt, the user can verify the result of the determination through his own experience, that is, correct conclusions drawn by the system. Therefore, this step is very necessary, which improves the stability of the control system to regulate the environment, really prolongs the quality guarantee period of food and saves energy. In addition, the above data is sent to the big data learner. The big data learner records user's preferences and behaviors, and then recommend appropriate recipes to reduce the cumbersome collection of data and unnecessary input. Through the long-time training of user feedback behavior, the system can finally automatically control the indoor parameters of the closed space and ensure the freshness of food without wasting energy.

The above functions improve the operation accuracy of the control system of the disclosure to a certain extent and avoid adverse conditions such as delay, misjudgment and so on.

In addition, the information collected by each information collection of the system is transmitted to a background of a studio for storage and preservation. On the one hand, it can be cross verified with the similar data of other users, and on the other hand, it can be compared with the subsequent operations of the user. The big data learning method not only establishes a large refrigeration database to facilitate the further development of system operation and maintenance, but also calculates users' preferences and facilitates users' production and life. Even if the user changes, the control system of the disclosure can still continue to provide high-quality intelligent services according to the preferences of new users.

Figure 2:
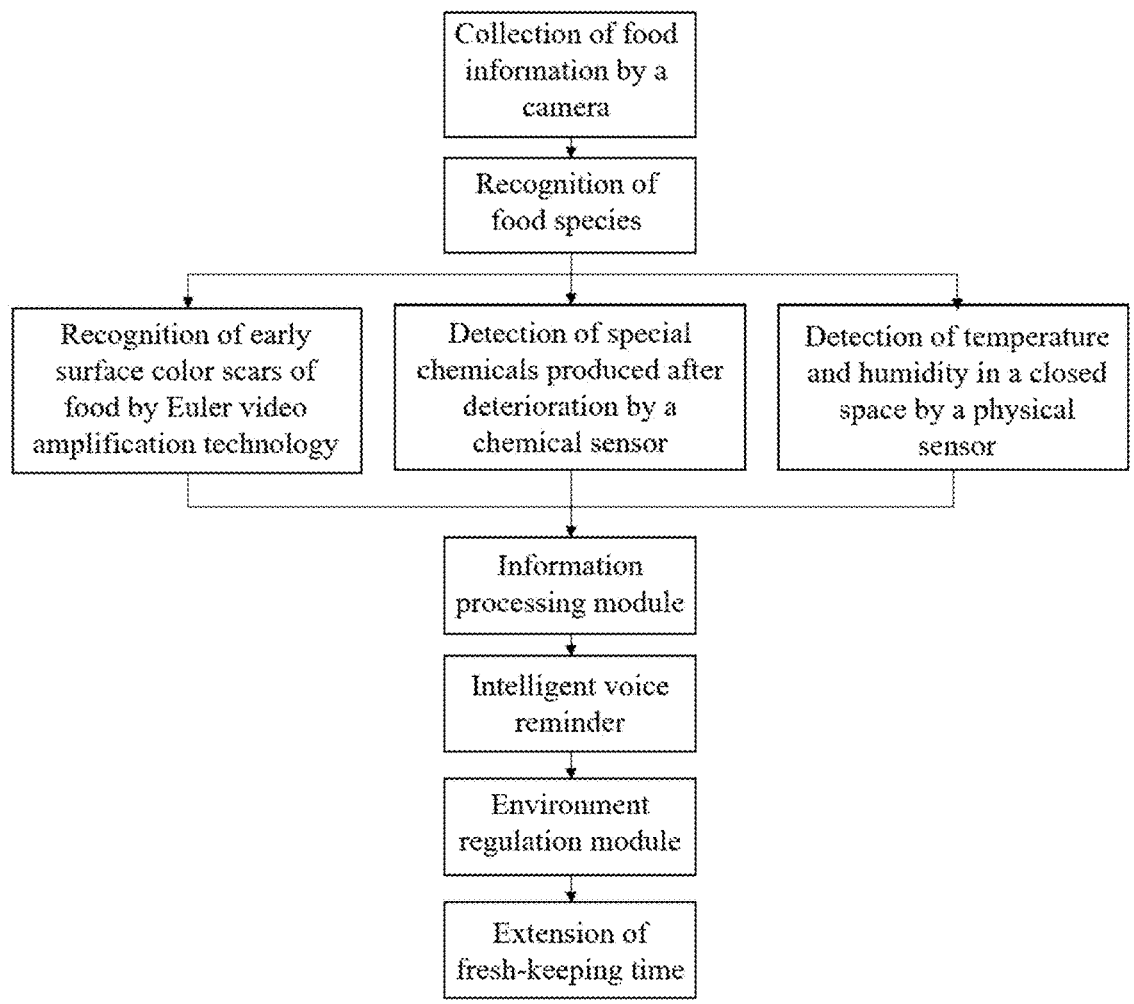
FIG. 2 is a schematic flowchart of a control method of refrigeration environment in a closed space based on computer vision.
Figure 3:
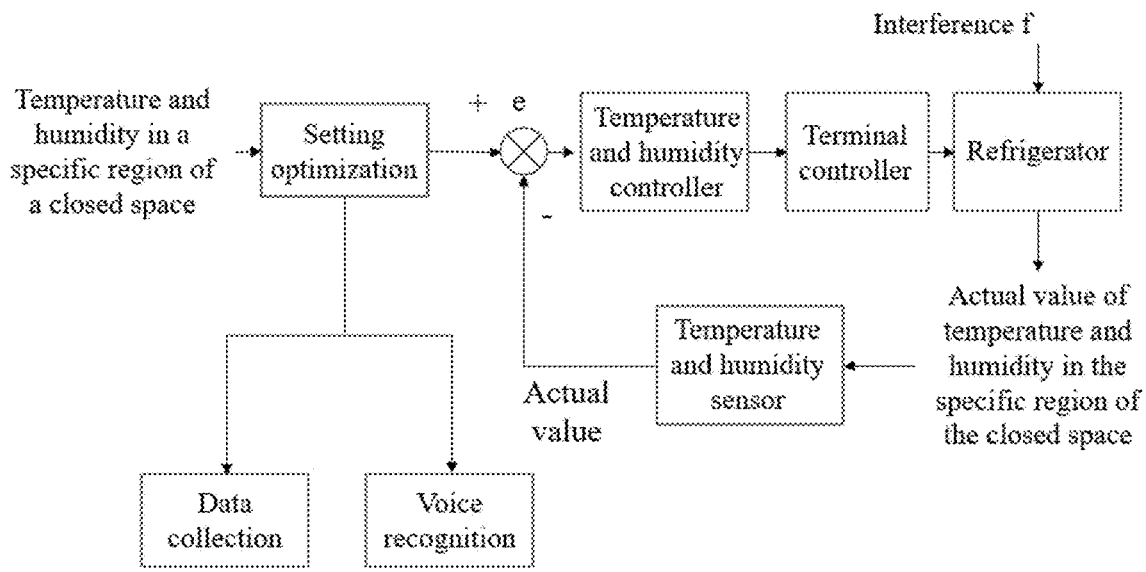
FIG. 3 is a schematic control logic diagram of a refrigeration terminal device combined with the control system of refrigeration environment in a closed space based on computer vision of the disclosure.

As shown in FIG. 2, working steps of the disclosure are as follows:

1. collecting information of an image of a food in a closed space through a non-contact camera;
2. segmenting the image according to divided regions, and identifying information of the food in each region, including number, types and so on, by convolution neural network; proceeding to step 3 when the food is not packaged, otherwise, determining storage time of the food in the closed space according to a historical record, prompting a user to use the food as soon as possible when time between the storage time and a quality guarantee period of the food is within a preset time range, and prompting the user that the food has expired when the storage time reaches or exceeds the quality guarantee period of the food;
3. analyzing collected video signals by using Euler video amplification technology to extract surface color distribution information of the food, identifying the scars in an early stage of food spoilage, and further determining a spoilage state of the food;
4. collecting physical and chemical data measured by sensors;
5. inputting information of temperature, humidity, special chemical substances, and the food surface color distribution formation to a fresh-keeping time prediction model, to determine a current state of food, so as to obtain remaining fresh-keeping time t of the good;
6. comparing the remaining fresh-keeping time t with a known fresh-keeping time t' of the food; performing no regulation on parameters in the closed space when a food fresh-keeping condition is good corresponding to the remaining fresh-keeping time t being greater than the known fresh-keeping time t'; regulating the environment of the closed space through the environment regulator when the food fresh-keeping condition is poor corresponding to the remaining fresh-keeping time t being less than or equal to the known fresh-keeping time t' (as shown in FIG. 3); and
7. sending a voice prompt by the control system according to the current state of the food to remind the user to deal with expired food or purchase lack of food materials; prompting the user to use the food as soon as possible when the remaining fresh-keeping time t is less than or equal to the known fresh-keeping time t' and the remaining fresh-keeping time t is not equal to 0 corresponding to the food fresh-keeping condition is poor; prompting the user that the food has expired when the remaining fresh-keeping time t is equal to 0 corresponding to the food having been corrupted; determining whether a system result is correct according to user feedback.
8. record data in a big data learner of an artificial intelligence processor and upload the data to a big data cloud background; and
9. turning on a sterilization lamp 2 according to the information of special chemical substances.

Solutions to adverse situations in specific implementation are as follows.

1. In view of the problem that large-scale cold storehouse needs uniform indoor temperature, in addition to ordinary cameras, an infrared camera can be added to observe whether the indoor temperature field is uniform, so as to increase the accuracy of the system.

2. If there are too many kinds of food and mixed functional regions, the system should first delineate the functional areas for food placement according to users' usual preferences.

When there are unknown varieties of food in the system, it can be connected to a large database to search for its fresh-keeping information.

3. If the food has deteriorated before the system prompts the user, an alarm threshold can be changed to extend the quality guarantee period.

4. If the result of intelligent semantic prompt is inconsistent with or quite different from the result actually observed by the user, data in this case is recorded in the artificial intelligence processor, a conclusion is drawn by comparing the previous experience, and take this result as a final control signal.

In the disclosure, corresponding adjustment can also be made according to a type of closed space.

Small cabinets are generally used to store different food types, such as fruits, meat, vegetables, etc., which requires that refrigeration functions of different regions in the cabinets are slightly different. According to actual demands of heat load in respective cabinets, the cooling capacity is accurately transmitted to each functional region. For example, increasing the humidity of the closed space is conducive to the storage of vegetables and fruits; and maintaining the temperature in the space close to 0° C. is more suitable for the storage of fish, meat and eggs. The system can divide storage function regions according to user habits, and independently control the temperature and humidity of each region. When the system detects the quantity and spoilage of food in this region, the temperature of this area will also be automatically regulated.

Large volume cabinets are usually used to store a large number of similar products, such as seafood products, vaccines, blood samples, etc., which require high uniformity of the temperature field in the closed space and even small temperature fluctuations can have an irreversible effect on product quality. Ordinary digital cameras are used to capture changes of indoor items, and combined with temperature and humidity sensors and some special chemical sensors to determine whether the refrigeration environment control system in the current space is running well. In this way, it avoids an accidental loss of users caused by product spoilage due to the large number of items, which is not easy for managers to check one by one, resulting in the product spoilage. In addition, it reduces the management burden of the managers, reduces the loss rate of products and operation management costs, and improves the management efficiency of large volume cabinets.

It is easy to breed all kinds of bacteria in a low-temperature closed space, some of which are harmful to human body, such as *Salmonella, Shigella, Listeria*, etc. They all come from deteriorated items stored in the cabinet. The use of ultraviolet light can effectively sterilize the bacteria in the closed space, so as to reduce cross-infection between foods, ensure food hygiene and safety, and prolong the food fresh-keeping time. Therefore, when the system detects slight changes on the food surface or special chemical substances, the light sterilizer will automatically turn on, sterilization time and power are different for different microbial types and food types.

The disclosure provides the control system for monitoring the refrigeration environment of the closed space based on computer vision technology. In this case, the control system is mainly used in a non-contact mode, combined with voice recognition and deep learning algorithm to record personnel's storage and purchase habits of food, the artificial intelligence processor can inform the expiration time of food in advance, remind users to purchase short food materials, and actively plan food region partition. Computer vision technology can replace human eyes to identify the types of food materials in space, which is the most core part of the whole intelligent control environment technology and an input signal of the subsequent post-processing. The food information is collected through the camera to identify the types and placement of food materials in the closed space. For different types of food materials have their unique storage characteristics, numerical control of temperature and humidity and on/off of sterilization lamp are performed. In addition, the artificial intelligence processor of the control system can also recommend dishes and recipes according to the existing food materials and user preferences, and can reasonably arrange the user's diet and low-calorie healthy recipes in combination with user's recent fitness plans. Moreover, for some users with diseases, such as diabetes patients, it can avoid users from eating high-fat, high sugar and other foods to prevent patients' blood glucose from rising, which will affect their health. For some users with allergy history, the system can also identify the food materials and prompt the personnel. The system can also realize the function of human-computer interaction. In addition to installing voice assistants, it will also be associated with smart phones to remotely transmit the types and quantity of food materials in the closed space, recommend today's recipes, and automatically search the nearest purchase location to supplement necessary food materials. Furthermore, some chemical sensors can measure the special chemical substances produced after the decay of fruits, vegetables and other food, so as to identify the quality guarantee period of food, which can be cross-validated with the results of computer vision technology to improve the monitoring accuracy.

The semantic recognizer is the last part of data collection. After receiving signals of non-contact measurement and sensor measurement, the information processor analyzes the information of food materials stored in the closed space to remind the user whether the food materials in the closed space need to be processed, such as replenishing short food materials and identifying expired food. In this situation, the intelligence of the control system is further improved, people's production and life are facilitated, and precise control of the closed space environment can be achieved. In addition, an intelligent voice query service is added to the semantic recognizer, the accuracy of the collected information is judged through the correctness of the information obtained by a querying controller, and the results of repeated verification is sent to the big data learner. This auxiliary function is very necessary, which will further improve the stability and accuracy of the system in identifying the state of food materials, truly improve people's daily life and production, and achieve the effect of energy saving. Moreover, the users' feedback information sent to the big data learner can further learn and remember the user's preferences. The system can recommend similar products according to different food preferences, which greatly enriches people's choice space. When the non-contact measurement results are inconsistent with the sensor measurement results, the intelligent voice inquiry will play a decisive optimization effect to prevent the control system from causing great deviation.

What is claimed is:

1. A control system of refrigeration environment in a closed space based on computer vision, comprising: a data collector, an information processor, an artificial intelligence processor, and an environment regulator;

wherein the data collector is configured to collect an image of a food in the closed space and transmit collected image of the food to the information processor, and further collect temperature and humidity information in the closed space and transmit collected temperature and humidity information to the environment regulator;

wherein the information processor is configured to identify a type of the food according to the collected image of the food received from the data collector; and further configured to:

in response to the food being not packaged, process the collected image of the food through Euler video amplification to obtain surface color distribution information of the food, determine a state of the food according to the surface color distribution information of the food and a historical learning result of the artificial intelligence processor, output a first state prompting instruction and a regulation instruction corresponding to the state of the food to the artificial intelligence processor and the environment regulator respectively, and send the surface color distribution information of the food to the artificial intelligence processor; and in response to the food being packaged, determine storage time of the food in the closed space according to a historical record, and output a second state prompting instruction to the artificial intelligence processor according to the storage time and a preset time threshold;

wherein the artificial intelligence processor is configured to provide, in response to one of the first state prompting instruction and the second prompting instruction received from the information processor, a state prompt to a user, receive and identify user feedback information, perform deep-learning using a deep-learning algorithm according to the surface color distribution information of the food, the one of first state prompting instruction and the second prompting instruction and the user feedback information to thereby obtain a learning result, and send the learning result to the information processor; and wherein the environment regulator is configured to regulate, in response to the regulation instruction received from the information processor, temperature and humidity in the closed space.

2. The control system according to claim 1, wherein the data collector is further configured to transmit the collected temperature and humidity information to the information processor; and the information processor is specifically configured to determine the state of the food according to the surface color distribution information of food, temperature and humidity in the collected temperature and humidity information, and the historical learning result of the artificial intelligence processor.

3. The control system according to claim 2, wherein the data collector is further configured to collect information of a preset chemical substance in the closed space and transmit collected information of the preset chemical substance to the information processor; and the information processor is specifically configured to determine the state of the food according to the surface color distribution information of the food, the temperature and the humidity in the collected temperature and humidity information, the collected information of the preset chemical substance, and the historical learning result of the artificial intelligence processor.

4. The control system according to claim 3, wherein the data collector comprises a non-contact chemical sensor, and the chemical sensor is configured to collect the information of the preset chemical substance in the closed space.

5. The control system according to claim 1, further comprising:
a light sterilizer;
wherein the data collector is further configured to collect information of a preset chemical substance in the closed space and transmit collected information of the preset chemical substance to the information processor; the information processor is further configured to transmit a sterilization instruction to the light sterilizer according to the collected information of the preset chemical substance; and the light sterilizer is configured to perform a light sterilization operation according to the sterilization instruction received from the information processor.

6. The control system according to claim 1, wherein the information processor is further configured to perform recognition of a food partition to obtain a recognition result and transmit a partition prompting instruction to the artificial intelligence processor according to the recognition result; and
wherein the artificial intelligence processor is further configured to provide, in response to the partition prompting instruction received from the information processor, a partition prompt to the user.

7. The control system according to claim 1, wherein the information processor is specifically configured to:
determine the state of the food according to the surface color distribution information of the food and the historical learning result of the artificial intelligence processor, and obtain remaining fresh-keeping time t of the food;
compare the remaining fresh-keeping time t with known fresh-keeping time t' of a food with the same type of the food;
output, in response to the remaining fresh-keeping time t being less than or equal to the known fresh-keeping time t', the regulation instruction to the environment regulator;
output, in response to the remaining fresh-keeping time t being less than or equal to the known fresh-keeping time t' and the remaining fresh-keeping time t being not equal to 0, a use prompting instruction to a semantic recognizer; and
output, in response to the remaining fresh-keeping time t being equal to 0, an expiration prompting instruction to the semantic recognizer.

8. The control system according to claim 1, wherein the information processor is specifically configured to identify, according to the collected image of the food received from the data collector, the type of the food through a convolution neural network.

9. A control method of refrigeration environment in a closed space based on computer vision, implemented by the control system according to claim 1, wherein the method comprises:
collecting an image of a food in the closed space, and temperature and humidity information in the closed space;
identifying a type of the food according to the image of the food; and
when the food is not packaged, processing the image of the food through Euler video amplification to obtain surface color distribution information of the food, determining a state of the food according to the surface color distribution information of the food and a historical learning result, providing a first state prompt to a user according to the state of the food, receiving and identifying user feedback information, learning based on the surface color distribution information of the food, the state of the food and the user feedback information to thereby obtain a learning result, regulating temperature and humidity in the closed space according to the state of the food; and
when the food is packaged, determining storage time of the food in the closed space according to a historical record, determining the state of the food according to the storage time and a known quality guarantee period and then providing a second state prompt to the user.

* * * * *